United States Patent
DeLuca et al.

(10) Patent No.: US 9,509,648 B2
(45) Date of Patent: Nov. 29, 2016

(54) ASSOCIATING SENTIMENT WITH OBJECTS PRESENTED VIA SOCIAL MEDIA

(71) Applicant: International Business Machines Corporation, Armonk, NY (US)

(72) Inventors: Lisa Seacat DeLuca, Baltimore, MD (US); Lydia M. Do, Raleigh, NC (US); Jenny S. Li, Danbury, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 177 days.

(21) Appl. No.: 14/250,801

(22) Filed: Apr. 11, 2014

(65) Prior Publication Data

US 2015/0295867 A1   Oct. 15, 2015

(51) Int. Cl.
*G06F 15/16* (2006.01)
*H04L 12/58* (2006.01)

(52) U.S. Cl.
CPC .............. *H04L 51/10* (2013.01); *H04L 51/32* (2013.01)

(58) Field of Classification Search
CPC ................................. H04L 51/10; H04L 51/32
See application file for complete search history.

(56) References Cited

U.S. PATENT DOCUMENTS

| 8,046,411 B2 | 10/2011 | Hayashi et al. |
| 2010/0048242 A1 | 2/2010 | Rhoads et al. |
| 2010/0204953 A1* | 8/2010 | Onishi ................. G06F 3/0304 702/150 |
| 2011/0050954 A1 | 3/2011 | Prentice |
| 2012/0014560 A1 | 1/2012 | Obrador et al. |
| 2012/0072939 A1* | 3/2012 | Crenshaw ............. H04H 60/33 725/12 |
| 2013/0117365 A1* | 5/2013 | Padmanabhan ....... H04W 4/206 709/204 |
| 2013/0253834 A1* | 9/2013 | Slusar ................ G01C 21/3608 701/540 |
| 2014/0053228 A1* | 2/2014 | Mahadevan ...... G06F 17/30165 726/1 |
| 2014/0118246 A1* | 5/2014 | Park ...................... G06F 3/0304 345/156 |
| 2014/0189524 A1* | 7/2014 | Murarka ................ G06Q 50/01 715/744 |
| 2014/0189531 A1* | 7/2014 | Murarka ................ G06Q 10/00 715/753 |

FOREIGN PATENT DOCUMENTS

WO   2013025355 A1   2/2013

* cited by examiner

*Primary Examiner* — Mohamed Wasel
(74) *Attorney, Agent, or Firm* — Erik K. Johnson

(57) ABSTRACT

An approach for associating a sentiment with a picture posted on a social media account is provided herein. A computing device receives user preferences associated with one or more pictures. The computing device detects at least one of an orientation of the computing device and a motion by a user of the computing device. The computing device determines a sentiment associated with a picture of the one or more pictures based on the user preferences and the detected at least one of the orientation of the computing device and the motion by the user of the computing device. The computing device posts the picture and the associated sentiment on a social media account.

17 Claims, 3 Drawing Sheets

ASSOCIATING SENTIMENT WITH OBJECTS PRESENTED VIA SOCIAL MEDIA

TECHNICAL FIELD

The present invention relates generally to social media, and more particularly to associating a sentiment with regard to one or more objects on social media.

BACKGROUND

Numerous social media users share their thoughts and feelings about certain items by way of liking and disliking. This can be accomplished by a user selecting the like or dislike option which often accompanies certain postings, such as, a picture uploaded by a friend or selecting the like or dislike option often associated with a company or product social media website. This allows social media users to examine how other social media users like, enjoy, or value a certain item or post. However, if a user desires to express his or her feelings about a certain product or object which already has an existing social media website, the process can be rather tedious, including taking a picture of the product or object and then posting an accompanying message related to the product or object.

SUMMARY

In one aspect, the present invention provides a method for associating a sentiment with a picture posted on a social media account is described herein. A computing device receives user preferences associated with one or more pictures. The computing device detects at least one of an orientation of the computing device and a motion by a user of the computing device. The computing device determines a sentiment associated with a picture of the one or more pictures based on the user preferences and the detected at least one of the orientation of the computing device and the motion by the user of the computing device. The computing device posts the picture and the associated sentiment on a social media account.

In another aspect, the present invention provides a computer program product for associating a sentiment with a picture posted on a social media account comprising: program instructions to receive user preferences associated with one or more pictures; program instructions to detect at least one of an orientation of the computing device and a motion by a user of the computing device; program instructions to determine a sentiment associated with a picture of the one or more pictures based on the user preferences, and the detected at least one of the orientation of the computing device and the motion by the user of the computing device; and program instructions to post the picture and the associated sentiment on a social media account.

In another aspect, the present invention provides a computer system for associating a sentiment with a picture posted on a social media account comprising: program instructions to receive user preferences associated with one or more pictures; program instructions to detect at least one of an orientation of the computing device and a motion by a user of the computing device; program instructions to determine a sentiment associated with a picture of the one or more pictures based on the user preferences, and the detected at least one of the orientation of the computing device and the motion by the user of the computing device; and program instructions to post the picture and the associated sentiment on a social media account.

In yet another aspect, the present invention provides a method for deploying a system for associating a sentiment with a picture posted on a social media account, comprising providing a computer infrastructure being operable to: receive user preferences associated with one or more pictures; detect at least one of an orientation of the computing device and a motion by a user of the computing device; determine a sentiment associated with a picture of the one or more pictures based on the user preferences and the detected at least one of the orientation of the computing device and the motion by the user of the computing device; and post the picture and the associated sentiment on a social media account.

DETAILED DESCRIPTION

Figure 1:
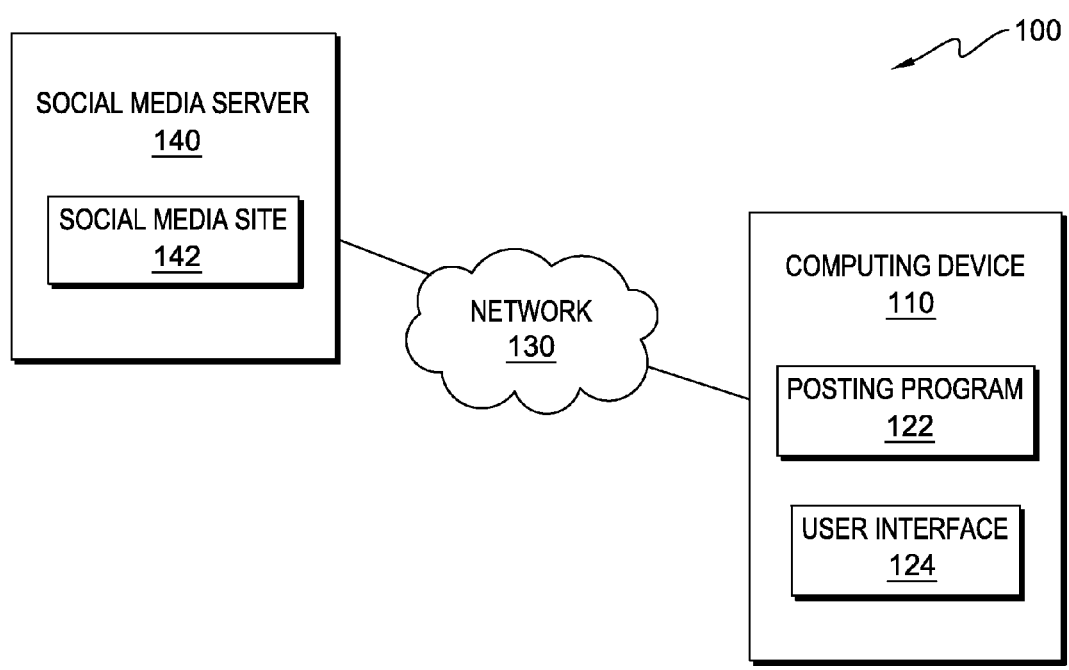
FIG. 1 illustrates an automatic posting system, in accordance with an embodiment of the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention will now be described in detail with reference to the accompanying Figures.

FIG. 1 illustrates automatic posting system 100, in accordance with an embodiment of the invention. In an exemplary embodiment, automatic posting system 100 includes computing device 110 and social media server 140 all interconnected via network 130.

In the exemplary embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a local area network (LAN), or a wide area network (WAN). In general, network 130 can be any combination of connections and protocols that will support communications between server 110 and social media server 140.

Social media server 140 includes social media site 142. Social media server 140 may be a remote computer device, desktop computer, a notebook, a laptop computer, a tablet computer, a handheld device, a smart-phone, a thin client, or any other electronic device or computing system capable of receiving and sending data to and from other computing devices, such as, computing device 110 via network 130. Although not shown, optionally, social media server 140 can comprise a cluster of web servers executing the same software to collectively process the requests for the web pages as distributed by a front end server and a load balancer. In an exemplary embodiment, social media server 140 is a computing device that is optimized for the support of websites, which reside on social media server 140, such as social media site 142, and for the support of network requests related to websites which reside on social media server 140. Social media server 140 is described in more detail with reference to FIG. 3.

Social media site 142 is a collection of files including, for example, HTML files, CSS files, image files and JavaScript files. Social media site 142 can also include other resources such as, audio files and video files. In an exemplary embodiment, social media site 142 is a social media website such as Facebook® (Facebook is a registered trademark of Facebook, Inc.), Twitter® (Twitter is a registered trademark of Twitter, Inc.), LinkedIn® (LinkedIn is a registered trademark of LinkedIn Corporation), or Instagram® (Instagram is a registered trademark of Instagram, LLC).

Computing device 110 includes posting program 122 and user interface 124. In the exemplary embodiment, computing device 110 is a smart phone; however, in other embodiments, computing device 110 may be a desktop computer, a notebook, a laptop computer, a tablet computer, a handheld device, a thin client, or any other electronic device or computing system capable of receiving and sending data to and from social media server 140 via network 130. Computing device 110 is described in more detail with reference to FIG. 3.

User interface 124 includes components used to receive input from a user and transmit the input to an application residing on computing device 110. In an exemplary embodiment, user interface 124 uses a combination of technologies and devices, such as device drivers, to provide a platform to enable users of computing device 110 to interact with posting program 122. In the exemplary embodiment, user interface 124 receives input, such as textual input received from a physical input device, such as a keyboard, via a device driver that corresponds to the physical input device. In addition, in the exemplary embodiment, user interface 124 is capable of receiving other types of input, such as motion. In another exemplary embodiment, user interface 124 is capable of receiving point of contact from the user on a different part of the computer device as input for sentiment before or after a picture is taken.

Posting program 122 is a software application capable of receiving user preferences from a user of computing device 110 via user interface 124. In addition, posting program 122 is capable of detecting motion, or position/orientation of computing device 110, and determining whether the detected motion or position/orientation indicates a positive, negative, or neutral sentiment based on received user preferences. The operations and functions of posting program 122 are described in further detail below with regard to FIG. 2.

Figure 2:
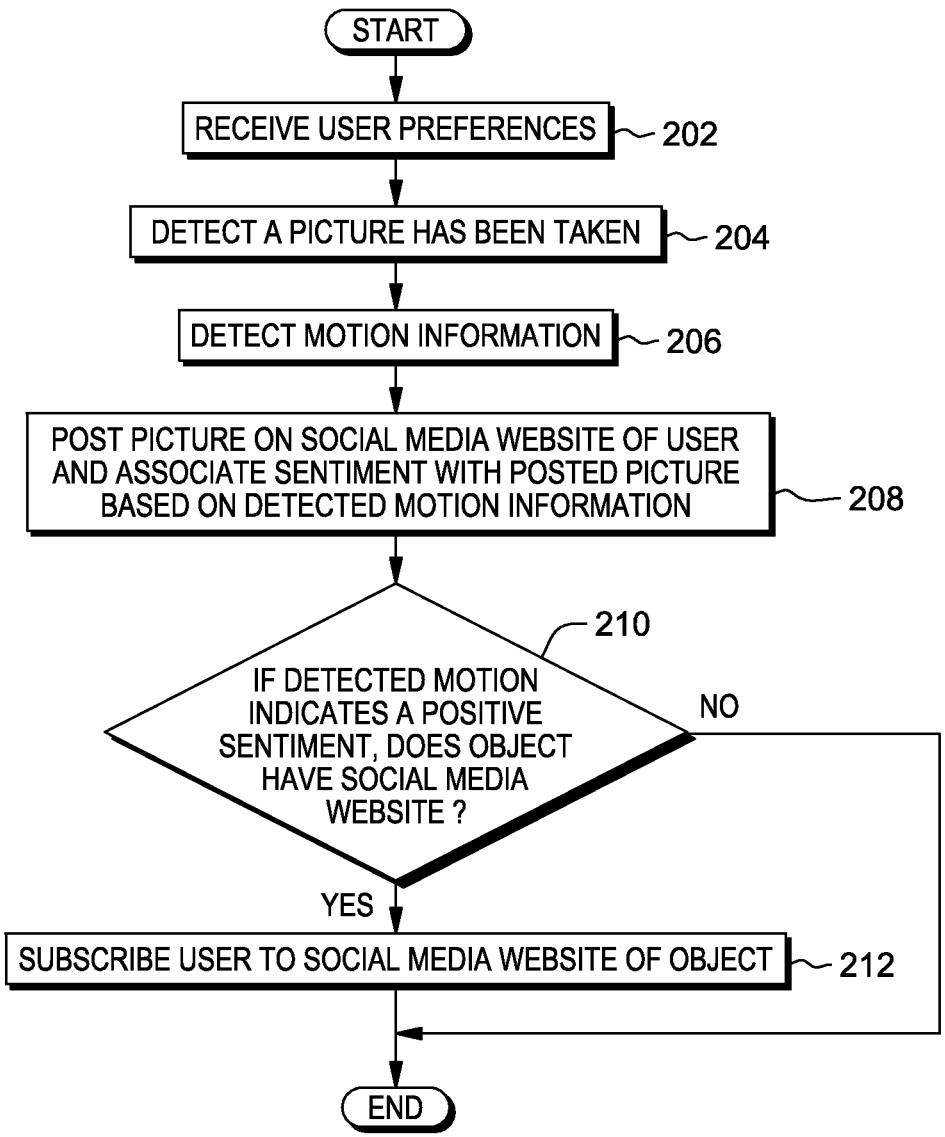
FIG. 2 is a flowchart illustrating the operations of the posting program of FIG. 1 in automatically associating a sentiment with a picture posted on a social media account of user, in accordance with an embodiment of the invention.

FIG. 2 is a flowchart illustrating the operations of posting program 122 in automatically posting a sentiment in association with a picture posted on a social media account of a user, in accordance with an exemplary embodiment of the invention. In an exemplary embodiment, posting program 122 receives user preferences, by way of inputs from the user of computing device 110 via user interface 124, that detail one or more types of inputs and sentiments, such as a "like" or a "dislike", which correspond to each type of input (step 202). For example, posting program 122 may receive user preferences detailing that, after a picture is taken, a motion upwards by the finger of the user indicates a positive sentiment, such as a "like", a motion downwards by the finger of the user indicates a negative sentiment, such as a "dislike", or a sideways motion by the finger of the user indicates a neutral sentiment. In other embodiments, the user preferences may detail that, while or after the picture is taken, if computing device 110, which in the exemplary embodiment is a smart phone, is turned upside, this indicates a negative sentiment, such as a "dislike", if computing device 110 is positioned on its left side, this indicates a positive sentiment, such as a "like", and if computing device 110 is positioned on its right side, this indicates a neutral sentiment. In this embodiment, the user may choose any other position to correspond to a positive, negative, or a neutral sentiment. In the exemplary embodiment, user preferences may detail one, two, three, or any other number of inputs and corresponding sentiments. In addition, in the exemplary embodiment, the user of computing device 110 may provide access credentials for one or more social media accounts within user preferences. In other embodiments, the user preferences contain default settings made by an administrator or third party.

Posting program 122 then detects that a picture has been taken (step 204). In the exemplary embodiment, posting program 122 may be fully or partially integrated with camera software present on computing device 110. In this embodiment, posting program 122 is invoked as the active application once a picture is taken. In other embodiments, posting program 122 communicates with the operating system of computing device 110 to determine that a picture has been taken.

Posting program 122 then detects motion information (input), receives the input via user interface 124, and determines what the motion indicates, based on the received user preferences (step 206). In the exemplary embodiment, posting program 122 may utilize motion detecting software to detect the movement of the finger of the user of computing device 110 and determine the direction of the motion. Posting program 122 then references the received user preferences to determine whether the determined direction of motion indicates a negative, positive, or neutral sentiment. In other embodiments, posting program 122 may detect the position or orientation of computing device 110 after the picture has been taken. In this embodiment, posting program 122 communicates with the operating system of computing device 110 or one or more listeners in order to determine the orientation of the phone. In even further embodiments, posting program 122 may be fully or partially integrated with an accelerometer, position sensor, and/or orientation sensor software. For example, posting program 122 may detect that a picture has been taken and then communicate with the operating system or utilize orientation sensor software to determine whether the orientation of the phone indicates a positive, negative, or neutral sentiment.

In another embodiment, if after a picture is taken, no input, such as motion, is detected by posting program 122, posting program 122 may provide the user of computing device 110 the option to provide input via user interface 124.

Posting program 122 then transmits the picture to social media server 140 via network 130 in order for the picture to be posted onto the social media account of the user of computing device 110 and associates a sentiment with the picture (step 208). In the exemplary embodiment, once posting program 122 detects motion information and determines what the motion indicates, user interface 124 of posting program 122 is invoked as the active screen. The user may then select a picture via user interface 124, which is then retrieved from memory and transmitted to social media server 140 with a request to be posted on the social media account of the user of computing device 110. The access credentials present in the user preferences of posting program 122 may be utilized in order to gain access to one or more social media accounts. In addition, posting program 122 transmits information to associate a sentiment, such as a "like" or "dislike", with the transmitted picture based on what the detected motion or position indicates. In the exemplary embodiment, a default message may also be associated with the picture based on whether the user of computing device 110 associated sentiment of the picture. This default message may be input into user interface 124 by the user of computing device 110 and stored with the user preferences associated with posting program 122. For example, the default message for a positive sentiment may be "Wow, this is a really cool pic". In another embodiment, posting program 122 can alter a default message dynamically based on the user's preferences, sentiments, the object, or brand identified from the picture. Overall, the default message may include text and emoticons associated with the sentiment, hyperlinks, time, location information, and metadata. In other embodiments, posting program 122 may postpone the transmission of the picture to social media site 142 until input, such as a motion, is received from the user of computing device 110 via user interface 124. In further embodiments, after receiving input and determining a sentiment to associate with a picture, posting program 122 presents the user of computing device 110 with the option to post the picture to social media site 142. In even further embodiments, posting program 122 may present the user of computing device 110 with the option to post a picture to social media site 142 even if no input, such as motion, indicating a sentiment has been received by posting program 122.

If the detected motion or position indicates a positive sentiment, posting program 122 determines if an object or brand depicted in the picture has a social media website or more than one social media website (decision 210). In the exemplary embodiment, the picture taken by the user of computing device 110 may contain one or more objects, such as an orange, a bottle of ketchup, or a bottle of soda. Posting program 122 may utilize object recognition or OCR recognition in order to determine what type of object and what, if any, brand of object is in the picture. For example, posting program 122 may utilize OCR recognition to determine that a bottle of soda is a specific brand. Posting program 122 then determines if the specific brand has a social media website, for example, by communicating with social media server 140. Additionally, object recognition may be utilized to determine that an object in the picture is an orange. Posting program 122 then determines if there is a social media website or more than one social media website for oranges. In another embodiment, posting program 122 determines if an object or brand depicted in the picture has a website other than a social media website.

If posting program 122 determines an object in the picture does not have a social media website (decision 210, "NO" branch), the process ends.

If posting program 122 determines an object in the picture does have a social media website or more than one social media website (decision 210, "YES" branch), posting program 122 subscribes the user of computing device 110 to the social media website by communicating with social media site 142 via network 130 (step 212). In other embodiments, posting program 122 may display a suggestion or an option to subscribe to the social media website to the user of computing device 110 via user interface 124. In further embodiments, posting program 122 may express the relevant sentiment associated with the picture on the social media website. For example, if posting program 122 determines that a positive sentiment is associated with the picture, posting program 122 may express the positive sentiment on the website or social media website of the object or brand depicted in the picture by way of, for example, "liking" the social media website. The posting program 122 may subscribe the user to the website of the object or brand depicted in the picture.

In another embodiment, the present invention may be utilized within the context of scanning quick response (QR) codes. For example, if the user of computing device 110 takes a picture of an object that is associated with a QR code, posting program 122 utilizes a QR code reader and scans the QR code. Posting program 122 then detects motion or position/orientation information and determines what the motion or position indicates based on user preferences. If posting program 122 determines that the detected motion or position information indicates that the user of computing device 110 has a positive sentiment, or "likes", the product or object associated with the QR code, posting program 122 determines whether there is a social media website associated with the QR code. Typically, if there is an associated social media website, the information regarding the website is contained with the QR code. If posting program 122 determines that there is a social media website associated with the QR code, posting program 122 subscribes the user of computing device 110 to the social media website. In further embodiments, if the user of computing device 110 takes a picture of an object that has an associated RFID tag, posting program 122 may utilize an RFID reader to scan the RFID tag and perform the same steps described above with regard to the QR code discussion.

In another embodiment, the invention provides a method that performs the process of the invention on a subscription, advertising, and/or fee basis. That is, a service provider, such as a Solution Integrator, could offer to provide functionality for automatically associating a sentiment with a picture posted on a social media account. In this case, the service provider can create, maintain, support, etc., a computer infrastructure, such as automatic posting system 100 (FIG. 1) that performs the processes of the invention for one or more consumers. In return, the service provider can receive payment from the consumer(s) under a subscription and/or fee agreement, and/or the service provider can receive payment from the sale of advertising content to one or more third parties.

In still another embodiment, the invention provides a computer-implemented method for automatically associating a sentiment with a picture posted on a social media account. In this case, a computer infrastructure, such as automatic posting system 100 (FIG. 1), can be provided, and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as automatic posting system 100 (FIG. 1), from a computer readable medium; (2) adding one or more computing devices to the computer infrastructure; and (3) incorporating and/or modifying one or more existing systems of the computer infrastructure to enable the computer infrastructure to perform the processes of the invention.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention, as defined by the accompanying claims.

Figure 3:
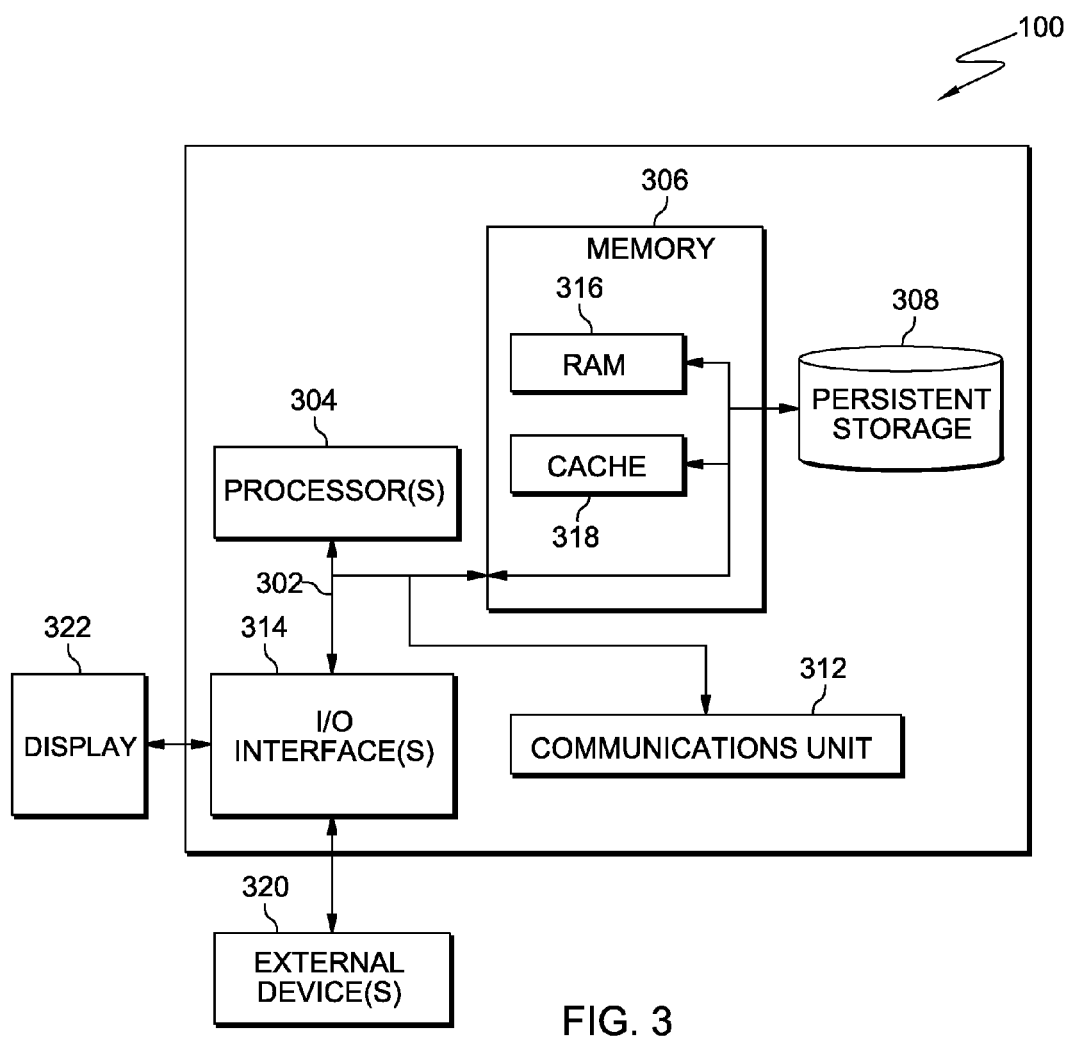
FIG. 3 is a block diagram depicting the hardware components of the automatic posting system of FIG. 1, in accordance with an embodiment of the invention.

FIG. 3 depicts a block diagram of components of computing device 110 and social media server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 and social media server 140 include communications fabric 302, which provides communications between computer processor(s) 304, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media.

The programs posting program 122 and user interface 124 in computing device 110 and social media site 142 in social media server 140 are stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, a read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links. The programs posting program 122 and user interface 124 in computing device 110, and social media site 142 in social media server 140 may be downloaded to persistent storage 308 through communications unit 312.

I/O interface(s) 314 allows for input and output of data with other devices that may be connected to computing device 110 and social media server 140. For example, I/O interface 314 may provide a connection to external devices 320 such as a keyboard, keypad, a touch screen, and/or some other suitable input device. External devices 320 can also include portable computer-readable storage media such as, for example, thumb drives, portable optical or magnetic disks, and memory cards. Software and data used to practice embodiments of the present invention, e.g., the programs posting program 122 and user interface 124 in computing device 110, and social media site 142 in social media server 140, can be stored on such portable computer-readable storage media and can be loaded onto persistent storage 308 via I/O interface(s) 314. I/O interface(s) 314 can also connect to a display 322.

Display 322 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for associating a sentiment with a picture posted on a social media account, comprising the steps of:
   a computing device receiving user preferences associated with one or more pictures, wherein the user preferences detail one or more motions and a positive sentiment corresponding to each of the one or more motions;
   the computing device detecting an orientation of the computing device;
   the computing device determining a sentiment associated with a picture of the one or more pictures based on the user preferences and the detected orientation of the computing device;
   the computing device determining that there is an object depicted within the picture;
   the computing device identifying a social media website associated with the object depicted within the picture based on the determined sentiment associated with the picture being positive;
   subscribing the user of the computing device to the social media website of the object; and
   the computing device transmitting and posting the picture and the associated sentiment on a social media account.

2. The method of claim 1, wherein the sentiment associated with a picture of the one or more pictures is further based on a detected motion by the user of the computing device.

3. The method of claim 1, wherein the user preferences detail at least one of one or more orientations of the computing device and a positive or negative sentiment corresponding to each of the one or more orientations of the computing device.

4. The method of claim 1, wherein the step of posting the picture and the associated sentiment on a social media account of the user of the computing device further comprises the computing device transmitting the picture and associated sentiment to another computing device.

5. The method of claim 1, further comprising the computing device creating a message in association with the picture, wherein the message is based on the associated sentiment.

6. The method of claim 5, further comprising the step of posting the created message in association with the picture and associated sentiment on the social media account of the user of computing device.

7. A computer program product for associating a sentiment with a picture posted on a social media account, the computer program product comprising:
one or more computer-readable storage devices and program instructions stored on at least one of the one or more tangible storage devices, the program instructions comprising:
program instructions to receive user preferences associated with one or more pictures, wherein the user preferences detail one or more motions and a positive sentiment corresponding to each of the one or more motions;
program instructions to detect an orientation of a computing device;
program instructions to determine a sentiment associated with a picture of the one or more pictures based on the user preferences and the detected orientation of the computing device;
program instructions to determine that there is an object depicted within the picture;
program instructions to identify a social media website associated with the object depicted within the picture based on the determined sentiment associated with the picture being positive;
program instructions to subscribe the user of the computing device to the social media website of the object; and
program instructions to transmit and post the picture and the associated sentiment on a social media account.

8. The computer program product of claim 7, wherein the sentiment associated with a picture of the one or more pictures is further based on a detected motion by the user of the computing device.

9. The computer program product of claim 7, wherein the user preferences detail one or more orientations of the computing device and a positive or negative sentiment corresponding to each of the one or more orientations of the computing device.

10. The computer program product of claim 7, wherein the program instructions to post the picture and the associated sentiment on a social media account of the user of the computing device further comprises program instructions to transmit the picture and associated sentiment to another computing device.

11. The computer program product of claim 7, further comprising program instructions to create a message in association with the picture, wherein the message is based on the associated sentiment.

12. The computer program product of claim 7, further comprising program instructions to post the created message in association with the picture and associated sentiment on the social media account of the user of computing device.

13. A computer system for associating a sentiment with a picture posted on a social media account, the computer system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:
program instructions to receive user preferences associated with one or more pictures, wherein the user preferences detail one or more motions and a positive sentiment corresponding to each of the one or more motions;
program instructions to detect an orientation of a computing device;
program instructions to determine a sentiment associated with a picture of the one or more pictures based on the user preferences and the detected orientation of the computing device;
program instructions to determine that there is an object depicted within the picture;
program instructions to identify a social media website associated with the object depicted within the picture based on the determined sentiment associated with the picture being positive;
program instructions to subscribe the user of the computing device to the social media website of the object; and
program instructions to transmit and post the picture and the associated sentiment on a social media account.

14. The computer system of claim 13, wherein the sentiment associated with a picture of the one or more pictures is further based on a detected motion by the user of the computing device.

15. The computer system of claim 13, wherein the user preferences detail one or more orientations of the computing device and a positive or negative sentiment corresponding to each of the one or more orientations of the computing device.

16. The computer system of claim 13, wherein the program instructions to post the picture and the associated sentiment on a social media account of the user of the computing device further comprises program instructions to transmit the picture and associated sentiment to another computing device.

17. The computer system of claim 13, further comprising program instructions to create a message in association with the picture, wherein the message is based on the associated sentiment.

* * * * *